… [19] United States Patent
Edwards et al.

[11] Patent Number: 5,689,697
[45] Date of Patent: Nov. 18, 1997

[54] SYSTEM AND METHOD FOR ASYNCHRONOUS DATABASE COMMAND PROCESSING

[75] Inventors: William Mitchell Edwards, Pflugerville; Domingo Segundo Hidalgo; Leigh Allen Williamson, both of Austin, all of Tex.

[73] Assignee: International Business Machines Corporation, Armonk, N.Y.

[21] Appl. No.: 469,703

[22] Filed: Jun. 6, 1995

Related U.S. Application Data

[63] Continuation of Ser. No. 266,052, Jun. 27, 1994, abandoned.

[51] Int. Cl.[6] .............................. G06F 17/30; G06F 7/00
[52] U.S. Cl. ........................ 395/603; 395/604; 395/608; 395/610; 395/200.03; 395/200.11; 395/825
[58] Field of Search ........................... 395/603, 610, 395/200.03, 200.11, 604, 608, 825

[56] References Cited

U.S. PATENT DOCUMENTS

| | | | |
|---|---|---|---|
| 4,751,635 | 6/1988 | Kret | 364/200 |
| 4,970,658 | 11/1990 | Durbin et al. | 364/513 |
| 5,077,658 | 12/1991 | Bendert et al. | 395/600 |
| 5,089,985 | 2/1992 | Chang et al. | 395/600 |
| 5,261,065 | 11/1993 | Urabe et al. | 395/425 |
| 5,261,094 | 11/1993 | Everson et al. | 395/600 |
| 5,261,097 | 11/1993 | Saxon | 395/650 |
| 5,327,558 | 7/1994 | Burke et al. | 395/650 |
| 5,408,656 | 4/1995 | Cohn et al. | 395/600 |
| 5,530,899 | 6/1996 | MacDonald | 395/837 |
| 5,546,455 | 8/1996 | Joyce et al. | 379/265 |

*Primary Examiner*—Thomas G. Black
*Assistant Examiner*—Jean Raymond Homere
*Attorney, Agent, or Firm*—Mark S. Walker

[57] ABSTRACT

A system and method for asynchronously processing SQL language statements in a database management system. A process assigns a unique database handle to each requested connection between an application program and a database. Each application can be concurrently connected to multiple databases. Databases are alternately activated for synchronous or asynchronous processing using the database handle. Following an asynchronous connection, SQL statements are dispatched for asynchronous processing. The application program dispatches an asynchronous statement, performs other processing and then periodically polls the database system to determine whether the statement has completed processing. SQL statement dispatch for synchronous processing performs like current synchronous SQL language systems by waiting for completion of SQL statement processing before continuing.

8 Claims, 2 Drawing Sheets

SYSTEM AND METHOD FOR ASYNCHRONOUS DATABASE COMMAND PROCESSING

This is a continuation of application Ser. No. 08/266,052 filed Jun. 27, 1994, now abandoned.

BACKGROUND OF THE INVENTION

1. Field of the Invention

The present invention relates to database management systems and more particularly to client/server database management systems. Still more particularly, the present invention relates to improvements in database client processing systems and methods that allow client requests to be asynchronously processed by the database management server.

2. Background and Related Art

Database management systems, and more particularly, relational database management systems (RDMS) are used to store data used by businesses, governmental units, and others. Relational database management systems are implemented on computer systems of all sizes from personal computers, to workstations and mainframes. The trend toward client/server application structures has also lead database management systems to adopt a client/server architecture. Client/server refers to a division of processing activities between a "client" that requests certain activities or services and a "server" that satisfies these requests.

Client/Server systems are frequently found in networked environments such as that shown in FIG. 1. A server system 10, consisting of a personal computer such as an IBM PS/2 Computer System, or a workstation such as the IBM RISC System/6000 Workstation, is provided to manage a disk resource 12 containing several hundred megabytes or even several gigabytes of data. The server system 10 may be divided into two partitions, a server partition 16 and a client partition 14. The server partition 16 will contain database management system code for managing the data on the disk resource 12. Server system 10 is connected through local area network (LAN) or Wide Area Network (WAN) 20 to other workstations 22, 24, 26. These are typically client workstations that share the disk resource 12. As shown, the client workstations may themselves have attached disk resources, e.g. disk 28 attached to client 26.

The separation of client and server functions has changed the relationship between the programs using the data and the sever providing data. Traditionally, the application program requested data through an application programming interface. The preferred language for relational database systems is the Structured Query Language (SQL) which has been standardized by ANSI as [standard identifier, citation.] SQL provides defined interfaces between an application and a database. SQL commands are provided for, among other things, connecting to a database, requesting data from a database, and inserting or updating data in a database. Current SQL syntax is entirely synchronized so that an application is connected to one database and each SQL request must be satisfied by the server before application processing continues. Thus, each SQL request causes the application to be blocked from further execution until the server returns the requested data to the requestor. This limits the ability of the client to perform other tasks while waiting for the requested data to be returned and may affect system performance. In addition, the current model limits connection of a client application program to at most one database at a time.

The SQL synchronized structure was adequate when a single computer performed both client and server functions. However, client server applications may be beneficially connected to more than one database at a time. In addition, application performance and responsiveness may be improved by allowing the system to perform other tasks while waiting for a reply from the database server, i.e. to allow asynchronous SQL or database command processing.

A technical problem therefore exists to provide a relational database management system that allows concurrent connection of a client application to two or more databases, A second problem is the need for asynchronous processing of database commands

SUMMARY OF THE INVENTION

The present invention provides a system and method for enabling database application programs to make multiple concurrent requests to a database manager for different databases. It also provides a system and method for the application program to continue processing while awaiting the asynchronous return of the requested data.

The present invention is directed to a method for asynchronously processing query statements in a database management system. The present invention comprises the steps of: connecting an application program to a database, the connection having a unique identifier; activating the connection for asynchronous processing; dispatching a query statement for processing on the activated connection; and periodically polling the database management system using the unique identifier to determine whether the dispatched query statement has completed processing.

It is therefore an object of the invention to provide a database management system that supports multiple clients each concurrently connectable to two or more databases.

It is yet another object to provide a s system in which a database command request need not be satisfied before a processor can continue to process other tasks.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
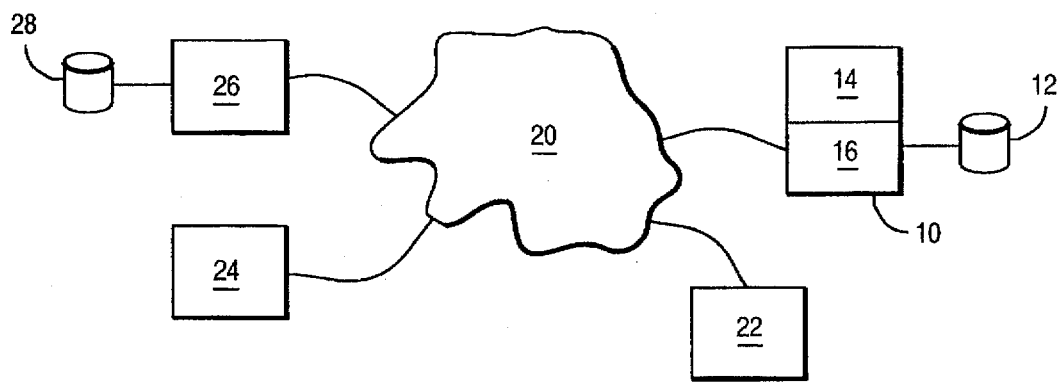
FIG. 1 is a diagram of a networked computer system according to the present invention.

The present invention will be described with reference to the attached drawing in which like reference numerals are applied to like elements of the invention illustrated in the drawing.

FIG. 1 illustrates the overall system in which the invention may be practiced. The preferred embodiment is implemented with client code on a client computer system, e.g. 24, and the server code on a server computer system 16. The invention may be practiced equally well, however, within a single computer system 10 that is divided into client 14 and server 16 components.

Figure 2:
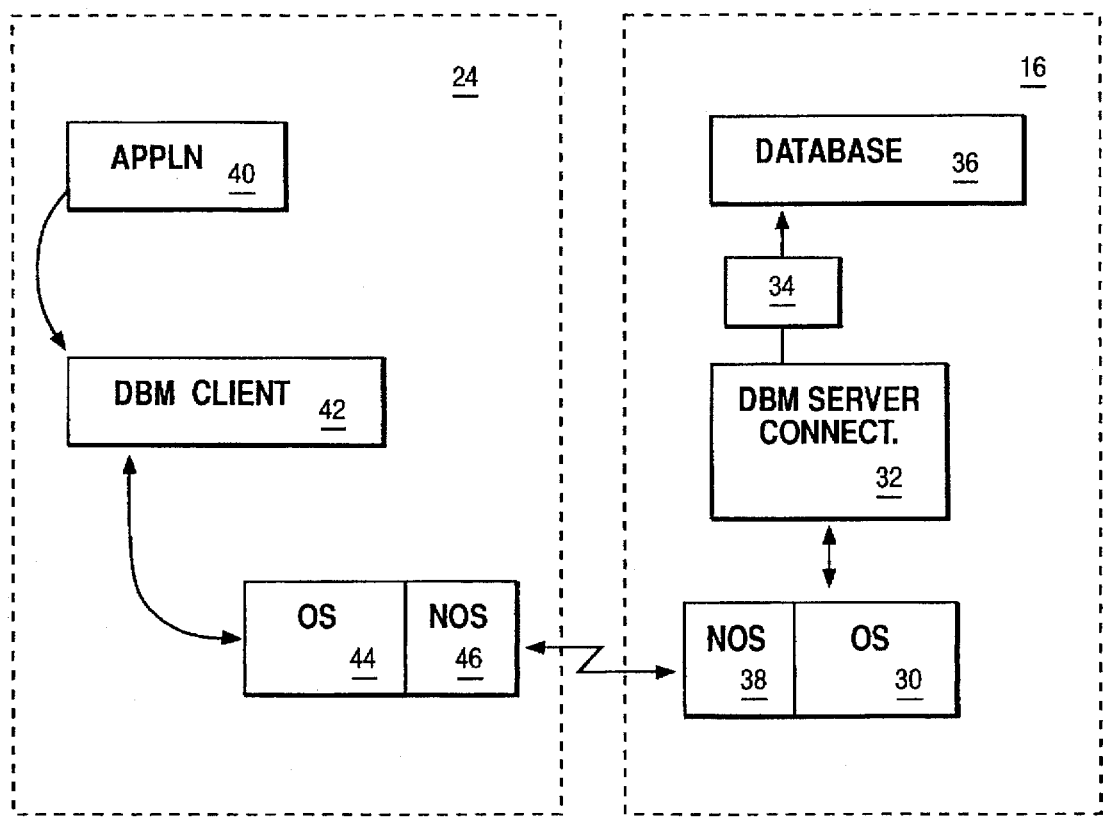
FIG. 2 is a block diagram of the components of a system according to the present invention.

A more detailed view of the components of the present invention is shown in FIG. 2. The preferred embodiment makes use of special data structures and processing unit synchronization mechanisms to support programming of concurrent asynchronous SQL database application programs. Client workstation 24 includes an application program 40 that performs a requested task, e.g. updating personnel records. Application program 40 communicates with Database Management System (DBM) client code 42 that translates an application request into a database request that will be transmitted to database server 16. DBM client 42 communicates with the Server using the Operating System 44 (e.g. OS/2 or AIX) and network operating system (NOS) 46. The network operating system communicates over a local area network or wide area network to the server 16. Examples of network operating systems are NetBIOS found in the IBM Lan Server product, Netware from Novell and TCP/IP from various vendors. Server 16 has a compatible NOS 38 and an operating system 30 (operating system 30 need not be the same as operating system 44. ) In the preferred embodiment both are either the IBM OS/2 operating system or the IBM AIX operating system. The present invention is not limited to any specific operating system or network operating system and one skilled in the art will be able to implement the method and system on any such platforms.

The application program 40 initiates a database request by establishing a connection to the database. The connection request is passed from the DBM Client 42 through the OS/NOS of the client and server to the DBM Server Connection process 32. The Server connection process 32 establishes database connection data structure 34 and interprocess communication resources necessary to satisfy client requests from database 36. The preferred embodiment implements a new "Database Connection" application programming interface (API). The connection API causes allocation of a connection data structure and establishment of several interprocess communication sessions (IPCs). The control handles of the IPCs are stored in the connection data structure. The completion of the connection process results in an abstract "connection handle" for the connection data structure being returned to the application program 40. The connection handle allows the application to unambiguously refer to the particular database connection. A connection data structure is allocated for each connection between an application program and a database. This structure permits multiple connection handles to exist for each application thus allowing concurrent connection to multiple databases from one application.

Figure 3:
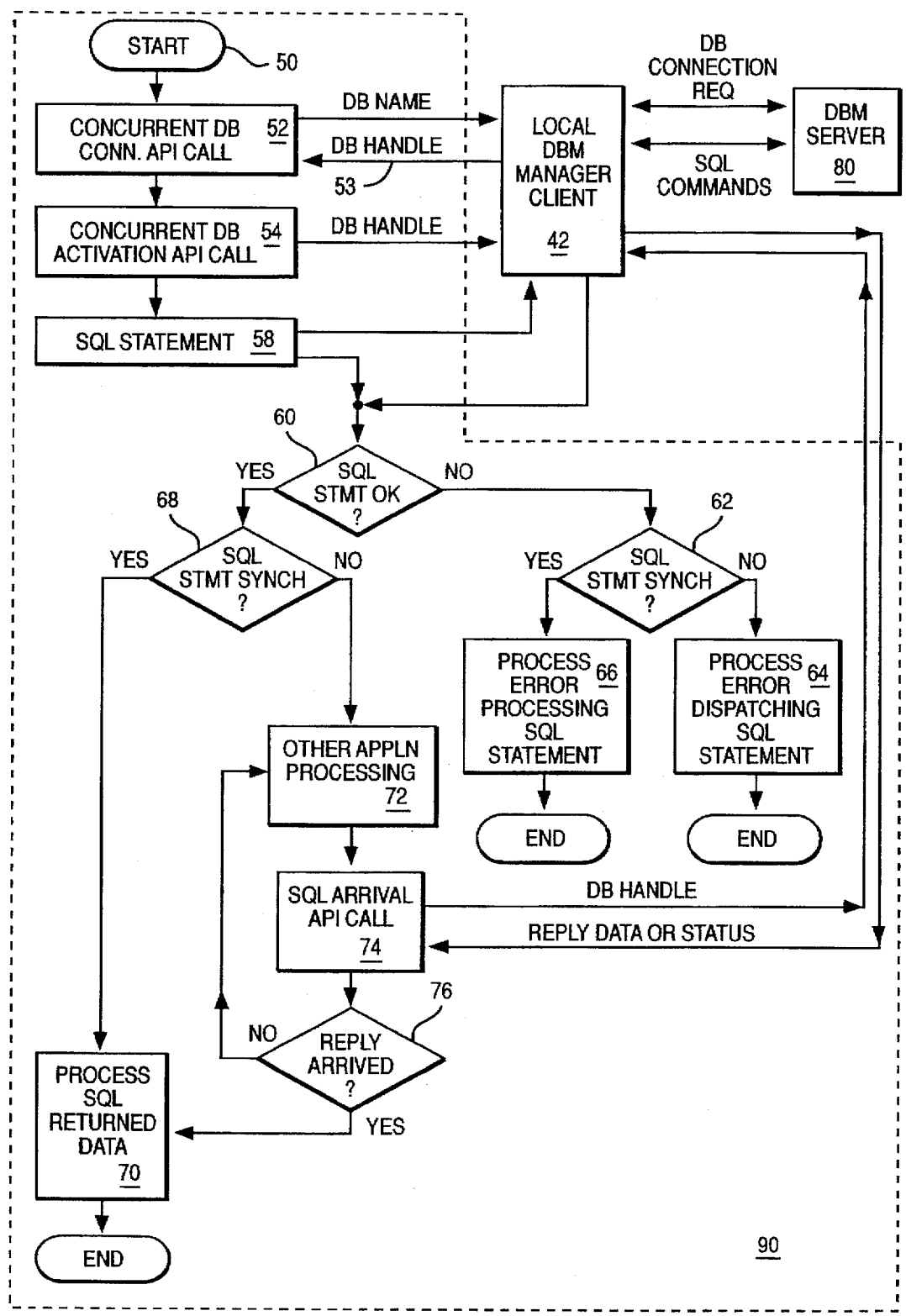
FIG. 3 is a flowchart of the asynchronous query processing according to the present invention.

Asynchronous SQL statement processing uses the concurrent connection mechanism to manage database connections. Processing of an SQL language statement according to the present invention is shown in the flowchart of FIG. 3.

Processing starts 50 and immediately proceeds to step 52 where the application obtains a connection handle to the database through DBM Client 42 which requests the DBM Server 50 to allocate a new database connection data structure and return a corresponding handle to the DBM client 52. Client 42 allocates the client version of the connection data structure, and stores in it the handles for IPCs created to communicate with the server 80. Client 42 creates a unique connection handle for the client version of the database connection data structure, and returns 53 that handle to the application. The database connection handle is used to activate a connection 54 when the application program seeks to access data. The activation request is passed to the DBM Client 42 and includes parameters indicating whether the database processing is to be synchronous or not. SQL language statements following an activation request are sent to the database indicated by the activation database handle. This association is dictated by the fact that SQL statement syntax contains no database attribute. Concurrent connections created according to the present invention allow many connections to be available for activation without incurring connection creation overhead for each new activation request.

An SQL language statement 58 is sent to the DBM Client 42 to initiate database processing. The SQL statement is "dispatched" to the DBM Server 80 for processing. DBM Client 42 provides a return code to the application. The meaning of the return code differs depending on the current configuration of the connection. The return code or status is tested at step 60 to determine whether the request was successfully completed. If the return code indicates failure, a test is made 63 to determine whether the statement was synchronous or asynchronous. If synchronous, a failure return code indicates an SQL processing failure and SQL statement error processing is initiated 66. If the statement is asynchronous, then the failure condition is passed to step 64 for SQL dispatching error indication.

If the SQL Statement status is OK in test 60 then a test of whether the request was synchronous is made at 68. If synchronous, the application waits for the DBM server statement processing to be completed and then processes the SQL returned data 70. If asynchronous, other application processing may occur 72. This processing is followed by an SQL Reply Arrival poll 74. The SQL Reply Arrival poll is sent to the DBM client and contains the DB Connection handle to identify the request. DB Client 42 tests to determine whether the most recent SQL statement for that DB Connection handle has completed processing. At this time DB client 42 does a non-blocking read of the IPC used to communicate with DB Server 80. If a reply has not arrived from the DBM Server, a negative status message is returned. If a reply has arrived, the first of the reply data is returned. The DB Client tests the response 76 and if a reply has arrived begins processing the SQL returned data 70. If no reply has been received, other application processing continues 72 until another SQL Arrival poll is sent. The SQL Arrival API poll is invoked by the application 90 at ta frequency established by that application.

A Disconnection API is transmitted by the application to terminate a database connection and to free the connection data structure and other system resources both at the DBM Server 80 and at the DBM client 42.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A computer implemented method for processing query statements by a database management system, the method comprising the steps of:

accepting a connection request from an application program for connecting said application program to said database management system;

establishing an interprocess connection in response to said connection request, the connection having a unique connection identifier;

testing to determine whether an asynchronous or synchronous connection was requested;

activating the connection for either synchronous or asynchronous processing, based on the results of the testing step;

accepting a query statement for processing on the activated connection; and when the connection has been activated for asynchronous processing, responding to periodic polling by the application program to the database management system using the unique connection identifier to indicate whether the dispatched query statement has completed processing;

returning reply data in response to the periodic polling if the dispatched query statement has completed processing; and returning an incomplete processing indicator otherwise.

2. The method of claim 1, wherein the query statements conform to Structured Query Language (SQL) syntax.

3. A database management system for processing query statements generated by an application program running on a computer system having memory and at least one processor said database management system running on a computer system having memory and at least one processor, the system comprising:

connection means in said database management system for accepting an application program interprocess connection request to a database and returning a unique connection identifier for the interprocess connection;

means for testing said connection request to determine whether asynchronous or synchronous query processing is requested;

means for activating the connection in an asynchronous mode if said test result indicates asynchronous processing is requested and activating the connection in synchronous mode otherwise;

means for accepting a query statement processing request from said application program to said database management system; and means for responding to periodic polling from the application program seeking to determine whether the query statement has completed processing;

means for returning data to said application program in response to said periodic polling if the query statement has completed processing;

means for returning an incomplete processing indicator otherwise.

4. The system of claim 4, further comprising:

interprocess communication means for communicating between said application program and said database management means;

control block means in said database management means for storing data associating said application program with said database in said database management system; and control block identification means for assigning a unique identifier to the control block means for uniquely identifying the connection.

5. The system of claim 3, wherein the query statement processing requests follow the syntax of are structured query language (SQL) statements.

6. A computer program product having a computer readable medium having computer program logic recorded thereon for causing a computer system to asynchronously to process query statements in a database management system, the computer program product comprising:

program product means for causing said computer system to accept from an application program a request to connect to a database in said database management system;

program product means for causing said computer system to establish a connection in response to said request and to return a unique identifier for the connection;

program product means for causing said computer system to test said request to connect to determine whether synchronous or asynchronous processing is requested;

program product means for causing said computer system to activate said connection in a synchronous or an asynchronous mode in response to said program product means for causing said computer system to test;

program product means for causing said computer system to accept a query statement dispatched to said database management system; and program product means for causing said computer system to respond to periodic polling from said application program to the database management system to determine whether the query statement has completed processing, if said connection is activated in asynchronous mode;

the computer program product of claim 1, further comprising:

program product means for causing said computer system to return data to said application program in response to said periodic polling if said query processing is complete or causing said computer system to return an incomplete processing indicator otherwise.

7. The computer program product of claim 6, further comprising:

program product means for causing said computer system to communicate between said application program and said database management means;

program product means for causing said computer system to create control blocks in said database management system; and program product means for causing said computer system to assign a unique identifier to the control blocks for uniquely identifying the connection.

8. The system of claim 6, wherein the query statements follow the syntax of are structured query language (SQL) statements.

* * * * *